United States Patent [19]

Korenobu

[11] 4,284,114

[45] Aug. 18, 1981

[54] LOCKING MEMBER FOR A CLAMPING BOLT

[76] Inventor: Toshihiko Korenobu, 15-5, Kida-cho, Neyagawa-shi, Osaka-fu, Japan

[21] Appl. No.: 29,485

[22] Filed: Apr. 12, 1979

[30] Foreign Application Priority Data

May 15, 1978 [JP] Japan .................. 53/066936[U]

[51] Int. Cl.³ .................. B60O 35/02; F16B 39/10
[52] U.S. Cl. .................................................. 411/119
[58] Field of Search .................. 151/54, 55, 56; 338/317, 315

[56] References Cited

U.S. PATENT DOCUMENTS

| | | | |
|---|---|---|---|
| 667,339 | 2/1901 | Ruffhead | 151/54 |
| 999,606 | 8/1911 | Stillwell | 151/54 |
| 1,052,380 | 2/1913 | Rell | 151/54 |

*Primary Examiner*—Casmir A. Nunberg
*Attorney, Agent, or Firm*—Wenderoth, Lind & Ponack

[57] ABSTRACT

A locking member for preventing a clamping bolt or nut for a rail fastener from loosening. The locking member has a downwardly extending leg for engaging the rail fastener which is clamped by the clamping bolt for preventing the bolt from loosening.

5 Claims, 3 Drawing Figures

LOCKING MEMBER FOR A CLAMPING BOLT

BACKGROUND OF THE INVENTION

The present invention relates to a locking means for preventing a clamping bolt or nut from loosening, and particularly to such means for use with a fastener for a railroad rail.

Conventionally, a rail is fastened, on each side thereof, by means of a spring clip which is clamped by a clamping bolt into a concrete tie. However, such a clamping bolt can become loose due to vibration which is transmitted from vehicles travelling thereon. This loosening requires periodical re-tightening work which takes up much time and labor.

SUMMARY OF THE INVENTION

An object of the present invention is to provide a locking means which eliminates the above-described a shortcoming.

BRIEF DESCRIPTION OF THE DRAWINGS

Other features and advantages of the present invention will become apparent from the following description taken with reference to the accompanying drawings, in which.

DETAILED DESCRIPTION OF THE INVENTION

Figure 1:
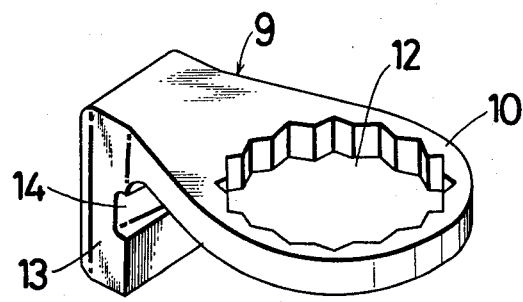
FIG. 1 is a perspective view of a locking member according to this invention.
Figure 2:
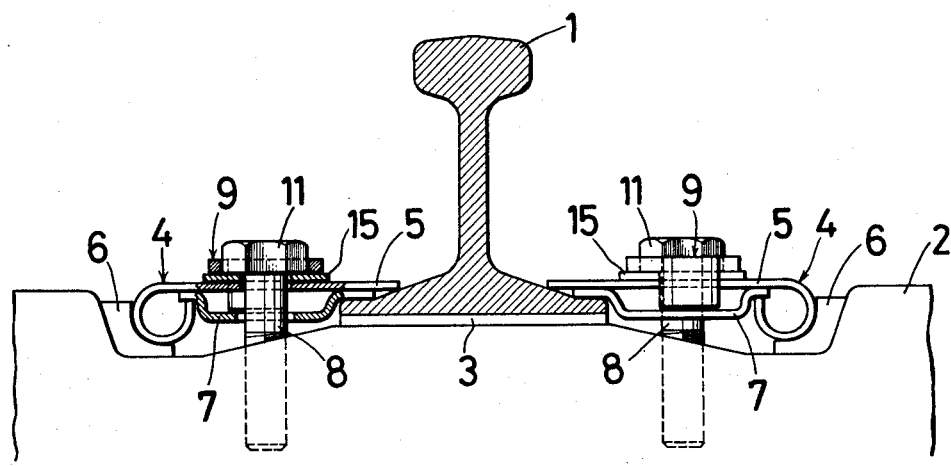
FIG. 2 is a cross-sectional front view showing how the locking member is used.

Referring to the drawings, a rail 1 is laid on a concrete tie 2 with a pad 3 therebetween. The rail is fastened by a conventional rail fastening means 4 at each side of the rail. In the preferred embodiment, the rail fastening means 4 comprises a spring clip 5 having one end holding down the rail 1 and the other end supported on a supporting base 6. A gauge block 7 is arranged under the spring clip 5 with its inner end inserted between the rail and the corresponding end of the spring clip. A clamping bolt 8 is passed through a washer 15, the spring clip 5 and the gauge block 7, and is tightened into a bolt hole in the concrete tie 2 for clamping the spring clip 5.

A locking member which is generally designated by the numeral 9 serves to prevent the clamping bolt 8 from loosening. As illustrated in FIG. 1, the locking member 9 includes a body 10 having a dodecagonal hole 12 for receiving the head 11 of the clamping bolt 8. The hole 12 for the clamping bolt 8 is formed by providing two hexagonal holes in the body 10 which are coaxial displaced 30 degrees from each other for providing many positions for the head 11 of the clamping bolt.

An engagement leg 13 extends downwardly from one end of the body 10 of the locking member 9. The engagement leg 13 has a horizontal groove 14 on its inner surface for receiving the side edge of the spring clip 5. Although in the preferred embodiment the horizontal groove increases in depth from one side to the other with the deepest portion at the side in the direction which the bolt 8 tends to loosen. It can be uniform in its depth throughout the entire width. Instead of a single groove, the engagement leg can have two horizontal grooves, one above the other, for receiving the spring clip 5 as well as the gauge block 7.

Although in the preferred embodiment a clamping bolt is screwed into the tie for fastening the spring clip 5, a clamping nut can be screwed on a bolt which is embedded in the tie. In this case, the hole in the locking member 9 is adapted to receive the nut head.

The locking means according to this invention is used to prevent the clamping bolt for the rail fastener from loosening. In operation, the clamping bolt 8 is tightened, along with the washer 15, by means of a tool such as a wrench to a point which is a number of turns slightly more than the turns required to clamp the spring clip 5. The locking member 9 is then placed on the head 11 of the clamping bolt 8 and the washer with its head fitting in the hole 12 and the engagement leg 13 facing the edge of the spring clip 5.

Figure 3:
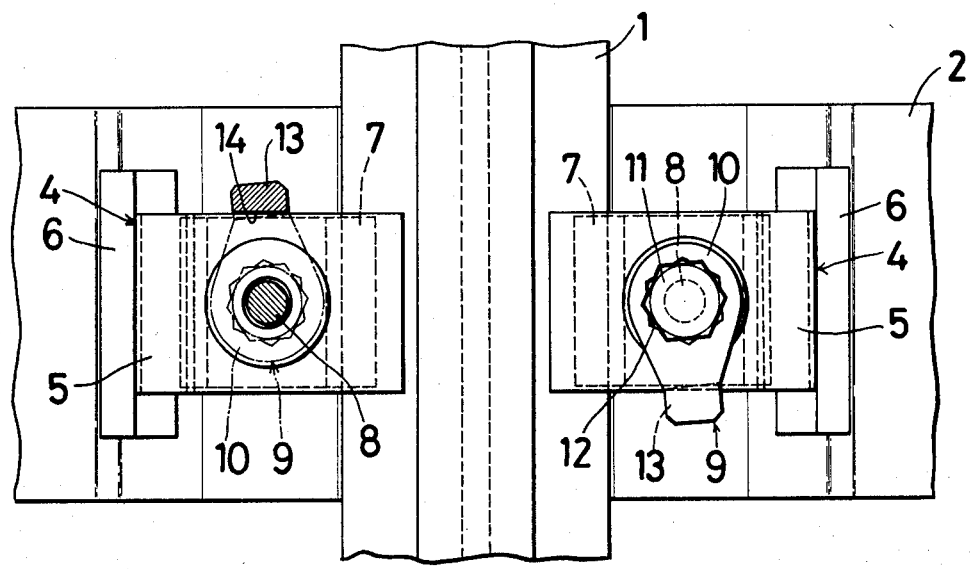
FIG. 3 is a plan view thereof.

The clamping bolt 8 is then loosened slightly. This causes the locking member 9 to turn slightly in the same direction so that, as illustrated in FIG. 3, the edge of the spring clip 5 tightly abuts against the inner wall of the groove 14 in the engagement leg. This ensures that the locking member 9 prevents the clamping bolt 8 from loosening.

To remove the locking member 9, the clamping bolt 8 is tightened slightly to disengage the locking member from the spring clip 5 so that it can be removed.

From the foregoing description, it will be understood that the locking means according to the present invention provides a simple and secure means for preventing the clamping bolt or nut from loosening. It eliminates the necessity of periodical re-tightening work.

Although the present invention has been described with reference to the fastening arrangement for the rail, it will be readily understood that this invention is applicable to clamping bolts for general purpose use.

What I claim:

1. A locking means for use with a clamping bolt or nut and fastener means associated therewith for preventing the clamping bolt from loosening, said locking means comprising:
   a generally flat body having a hole therethrough, the walls of said body defining said hole having a shape wherein said hole has a dodecagonal shape for receiving the head of the clamping nut or bolt; and
   an engagement leg portion extending downwardly from one end of said body, said engagement leg portion having at least one horizontally extending groove on its inner surface.

2. A locking means as in claim 1 wherein said groove has a uniform depth.

3. A locking means for use with a clamping bolt or nut and fastener means associated therewith for preventing the clamping bolt from loosening, said locking means comprising:
   a generally flat body having a hole therethrough, the walls of said body defining said hole having a shape wherein said hole has a dodecagonal shape for receiving the head of the clamping nut or bolt; and
   an engagement leg portion extending downwardly from one end of said body, said engagement leg portion having at least one horizontally extending groove on its inner surface, said at least one horizontally extending groove having a gradually increasing depth with the deepest portion being located at the side in the direction in which the bolt is loosened.

4. A locking means as in claim 1 or 3 wherein said at least one horizontally extending grooves comprises two grooves.

5. A locking means as in claim 1 or 3 wherein said at least one horizontally extending groove comprises one groove.

* * * * *